United States Patent
Harres

(10) Patent No.: US 7,177,364 B2
(45) Date of Patent: Feb. 13, 2007

(54) SYSTEM, DECODER AND METHOD FOR TRANSMITTING, RECEIVING AND DECODING HIGH-SPEED DIGITAL DATA SIGNALS WITH REDUCED ELECTROMAGNETIC EMISSIONS

(75) Inventor: Daniel N. Harres, Belleville, IL (US)

(73) Assignee: The Boeing Company, Seattle, WA (US)

( * ) Notice: Subject to any disclaimer, the term of this patent is extended or adjusted under 35 U.S.C. 154(b) by 769 days.

(21) Appl. No.: 10/043,577

(22) Filed: Jan. 10, 2002

(65) Prior Publication Data

US 2003/0128768 A1    Jul. 10, 2003

(51) Int. Cl.
*H04L 23/02* (2006.01)
*H04L 5/12* (2006.01)

(52) U.S. Cl. ............... 375/261; 375/223; 375/323; 375/324; 329/306

(58) Field of Classification Search ............. 375/261, 375/253, 242, 327, 371, 376, 271, 353; 328/127, 328/104
See application file for complete search history.

(56) References Cited

U.S. PATENT DOCUMENTS

| | | | |
|---|---|---|---|
| 4,633,426 A | 12/1986 | Venier | |
| 4,700,360 A * | 10/1987 | Visser | 375/238 |
| 4,731,816 A | 3/1988 | Hughes-Hartogs | |
| 5,031,173 A * | 7/1991 | Short et al. | 370/342 |
| 5,222,144 A * | 6/1993 | Whikehart | 381/15 |
| 5,608,764 A | 3/1997 | Sugita et al. | |
| 5,838,667 A | 11/1998 | Bingham et al. | |
| 5,859,671 A | 1/1999 | Kim | |
| 6,061,405 A | 5/2000 | Emami | |
| 6,188,723 B1 | 2/2001 | Lee et al. | |
| 6,310,926 B1 | 10/2001 | Tore | |
| 6,493,409 B1 * | 12/2002 | Lin et al. | 375/375 |
| 2001/0024468 A1 * | 9/2001 | Miyashita et al. | 375/228 |
| 2001/0031014 A1 | 10/2001 | Subramanian et al. | |

OTHER PUBLICATIONS

Dakashi Agrawal, Vahid Tarokh, Ayman Naguib, Nambi Seshadri; *Space-Time Coded OFDM for high Data-Rate Wireless Communication Over Wideband Channels*; 5 pages.; Coordinated Science Lab, University of Illinois, Urbana, Illinois, and AT&T Labs Research, Florham Park, New Jersey.

H. Steendam, M. Moeneclaey; *MC-CDMA Performance in the Presence of Timing Errors*; 5 pages; Department Telin, University of Gent, St. Pietersnieuwstraat; Belgium.

* cited by examiner

*Primary Examiner*—Mohammed Ghayour
*Assistant Examiner*—Qutub Ghulamali
(74) *Attorney, Agent, or Firm*—Alston & Bird LLP

(57) ABSTRACT

A digital communications system includes a transmitter and a receiver. The transmitter is capable of quadrature amplitude modulation (QAM) encoding each bit of at least one n-bit digital signal into at least one QAM signal and thereafter transmitting the QAM signals. And the receiver is capable of receiving the QAM signals and thereafter integrating the QAM signals. The receiver includes at least one tapped-delay line filter, which can then receive the integrated QAM signals and thereafter output a representation of each bit of the at least one n-bit digital signal.

27 Claims, 9 Drawing Sheets

SYSTEM, DECODER AND METHOD FOR TRANSMITTING, RECEIVING AND DECODING HIGH-SPEED DIGITAL DATA SIGNALS WITH REDUCED ELECTROMAGNETIC EMISSIONS

FIELD OF THE INVENTION

The present invention relates generally to systems and methods for transmitting signals and, more particularly, to systems and methods for transmitting, receiving and decoding high-speed digital data signals with reduced electromagnetic emissions.

BACKGROUND OF THE INVENTION

High speed data transmission and communications are conventionally accomplished by transmitting communications carrier signals, such as optical or radio frequency ("RF") signals, from one device, such as an optical or RF transmitter or one or more intermediate relay stations, to another device, such as a signal detector, e.g., an optical or RF detector, at the front end of a communications receiver. The communications carrier signals are typically formatted according to a predetermined communications standard which assigns the signal characteristics which define a logic "0" and a logic "1." Many modern high-speed communications systems implement communications standards capable of near gigabit-per-second transmission rates, including Firewire, Gigabit Ethernet and Fibre Channel. Other communications systems utilizing communications standards such as 100baseT Ethernet and VDSL are capable of baud rates of or near 100 megabit-per-second.

With the transmission of communications many communications systems generate a level of undesirable electromagnetic emissions. Everything else being equal, the lower the emissions of the communications in a communication system, the lower the probability that the communication system will interfere with the other electronic functions of the system employing the communication system. Generally, however, transmission mediums tend to exhibit characteristics of antennas as the frequency of the carrier signals increase and, as such, electromagnetic emissions tend to increase. And whereas communications systems in complex systems such as automotive and aircraft systems have stringent standards for the quality of transmissions, the standards for the quality of transmissions become even more stringent as the carrier frequency increases.

Among the reasons for having stringent standards in complex systems in automotive and aircraft systems, the communication system must be designed so as to not interfere with the reception in simultaneously operating radio communication systems. And due to the stringent requirements of the communication system, including not interfering with the radio reception, the power spectral density of the electromagnetic emissions from any electronic function on the automobile or aircraft must be extremely low throughout the RF frequency range. Additionally, because many complex automotive and aircraft systems operate via low cost transmission mediums, such as inexpensive twisted-pair cable, the communications standard must satisfy the electromagnetic emissions requirements with such transmission mediums, unless the entire transmission medium is replaced with a more complex and costly medium.

Many of the modern communications standards, including Firewire, Gigabit Ethernet, Fibre Channel, 100baseT Ethernet and VDSL, are capable of operating in complex communications systems such as those in modern automotive or aircraft systems. But to implement such high-speed communications standards may require that the communications data rate be lowered or may require a more costly transmission medium be used. Therefore, it would be desirable to design a system that provides a simple communications standard that, unlike the aforementioned communications standards, is capable of transmitting, receiving and decoding high-speed digital data signals in existing complex communications systems to reduce electromagnetic emissions associated with high-speed data transmissions. Additionally, the system would be capable of operating via the existing low-cost transmission mediums of such systems.

SUMMARY OF THE INVENTION

In light of the foregoing background the present invention provides an improved system, decoder and method for transmitting, receiving and decoding high-speed digital data signals with reduced electromagnetic emissions. Also, the system, decoder and method of the present invention can operate via existing low-cost transmission mediums. Further, the system, decoder and method of the present invention allow for decoding high-speed data signals in a relatively straightforward and inexpensive manner when compared to conventional decoders. According to one aspect of the present invention, a digital communications system comprises a transmitter and a receiver. The transmitter is capable of quadrature amplitude modulation (QAM) encoding each bit of at least one n-bit digital data signal into at least one QAM signal and thereafter transmitting the QAM signals, such as at a transmission rate, t. By modulating the digital data signal according to the QAM method, which spreads the signal energy over multiple carrier frequencies, the system can transmit and receive the digital data signals with a substantial reduction in electromagnetic emissions, thus allowing for high-speed data transmission and reception over conventional low-cost transmission mediums, such as twisted-pair cable.

The receiver, which includes at least one tapped-delay line filter, is capable of receiving the QAM signals. Following receipt, the receiver is capable of integrating the QAM signals, such as with at least one integrator. The tapped-delay line filter is then capable of receiving the integrated QAM signals and thereafter outputting a representation of each bit of the n-bit digital signal. The receiver can additionally or alternatively output each bit of the n-bit digital signal based upon a comparison of the representation of each bit to a predetermined threshold.

In one embodiment, for example, the receiver includes n integrators capable of integrating the at least one QAM signal, and includes n tapped-delay line filters. Further, the receiver can include n comparators capable of receiving the representation of each bit of the n-bit digital signal and thereafter outputting each bit of the n-bit digital signal based upon a comparison of the representation of each bit to a predetermined threshold.

The QAM signals can include at least one in-phase portion modulated by at least one carrier signal at a carrier frequency of $f_c$. In this regard, the receiver is capable of integrating the in-phase portions of the QAM signals, and the tapped-delay line filters of the receiver are capable of receiving the integrated in-phase portion of the QAM signals and thereafter outputting a representation of the n-bit digital signal. The carrier frequencies can include n/2 carrier frequencies, with each carrier frequency equal to a fraction of the transmission rate t/i where i=1, 2, 4, 8 ... n. The number of delay elements, $m_{in}$, of the tapped-delay line filters that are capable of receiving the integrated in-phase portion of the QAM signals can equal $(f_c/t) \times 2 \times n$. And each delay element of the tapped-delay line filters that are capable of receiving the integrated in-phase portion of the QAM signals can have a delay of $2\Delta$, where $\Delta$ equals $n/(2 \times t \times m_{in})$.

Similar to the in-phase portions of the QAM signals, the QAM signals can include at least one quadrature-phase portion that includes a phase orthogonal to respective in-phase portions of the QAM signals. In this regard, at least one integrator is capable of integrating the quadrature-phase portions of the QAM signals, and at least one tapped-delay line filter is capable of receiving the integrated quadrature-phase portions of the QAM signals and thereafter outputting a representation of at least one bit of the n-bit digital signal. The number of delay elements, $m_q$, of the tapped-delay line filters that are capable of receiving the integrated quadrature-phase portions of the QAM signals can equal $(f_c/t) \times 2 \times n+1$. And the delay elements of the tapped-delay line filters that are capable of receiving the integrated quadrature-phase portion of the QAM signals can include intermediate delay elements bounded by at least one end delay element, with each intermediate delay element having a delay of $2\Delta$, and each end delay element having a delay of $\Delta$. In this regard, delay $\Delta$ can equal $n/(2 \times t \times (m_q-1))$.

According to another aspect of the present invention, a decoder for decoding at least one QAM signal into at least one n-bit digital signal includes at least one integrator capable of integrating the QAM signals. Further, the decoder includes at least one tapped-delay line filter comprising at least one delay element, where the tapped-delay line filters are capable of receiving the integrated QAM signals and thereafter outputting a representation of each bit of the n-bit digital signal. The decoder can further include at least one comparator capable of receiving the representation of each bit of the n-bit digital signal and thereafter outputting each bit of the n-bit digital signal based upon a comparison of the representation of each bit to a predetermined threshold.

For example, the decoder can comprise n integrators, n tapped-delay line filters and, in embodiments including the comparators, n comparators. According to a further embodiment, the QAM signals are capable of being transmitted at a rate of t. Further, the QAM signals can include the in-phase portions modulated by at least one carrier signal at a carrier frequency of $f_c$. For example, the carrier frequencies can include n/2 carrier frequencies, with each carrier frequency equal to a fraction of the transmission rate t/i where i=1, 2, 4, 8 ... n. In this embodiment, at least one integrator can integrate the in-phase portion, and at least one tapped-delay line filter can receive the integrated in-phase portion and thereafter output a representation of at least one bit of the n-bit digital signal. Also, the number of delay elements, $m_{in}$, of the tapped-delay line filters that are capable of receiving the integrated in-phase portion of the QAM signals can equal $(f_c/t) \times 2 \times n$. Further, each delay element of the tapped-delay line filters that are capable of receiving the integrated in-phase portion of the QAM signals can have a delay of $2\Delta$, where $\Delta$ equals $n/(2 \times t \times m_{in})$.

Similarly, the QAM signals can include at least one quadrature-phase portion that includes a phase orthogonal to respective in-phase portions of the QAM signals. As such, at least one integrator can integrate the quadrature-phase portion of the QAM signals, and at least one tapped-delay line filter can receive the integrated quadrature-phase portion of the QAM signals and thereafter output a representation of at least one bit of the n-bit digital signal. Also, the number of delay elements, $m_q$, of the tapped-delay line filters that are capable of receiving the integrated quadrature-phase portion of the QAM signals can equal $(f_c/t) \times 2 \times n+1$. Additionally, the delay elements of the tapped-delay line filters that are capable of receiving the integrated quadrature-phase portion of the QAM signals can include intermediate delay elements bounded by at least one end delay element, with each intermediate delay element having a delay of $2\Delta$ and each end delay element having a delay of $\Delta$, where $\Delta$ equals $n/(2 \times t \times (m_q-1))$.

Therefore, by modulating the digital data signal according to the QAM method, which spreads the signal energy over multiple carrier frequencies, the system and method can transmit and receive the digital data signals with a substantial reduction in electromagnetic emissions. The reduction in electromagnetic emissions allows the system, decoder and method of the present invention to transmit and receive high-speed data signals over conventional low-cost transmission mediums, such as twisted-pair cable. Further, the system, decoder and method of the present invention are capable of decoding the high-speed data signals in a relatively straightforward and inexpensive manner when compared to conventional systems.

BRIEF DESCRIPTION OF THE DRAWINGS

Figure 1:
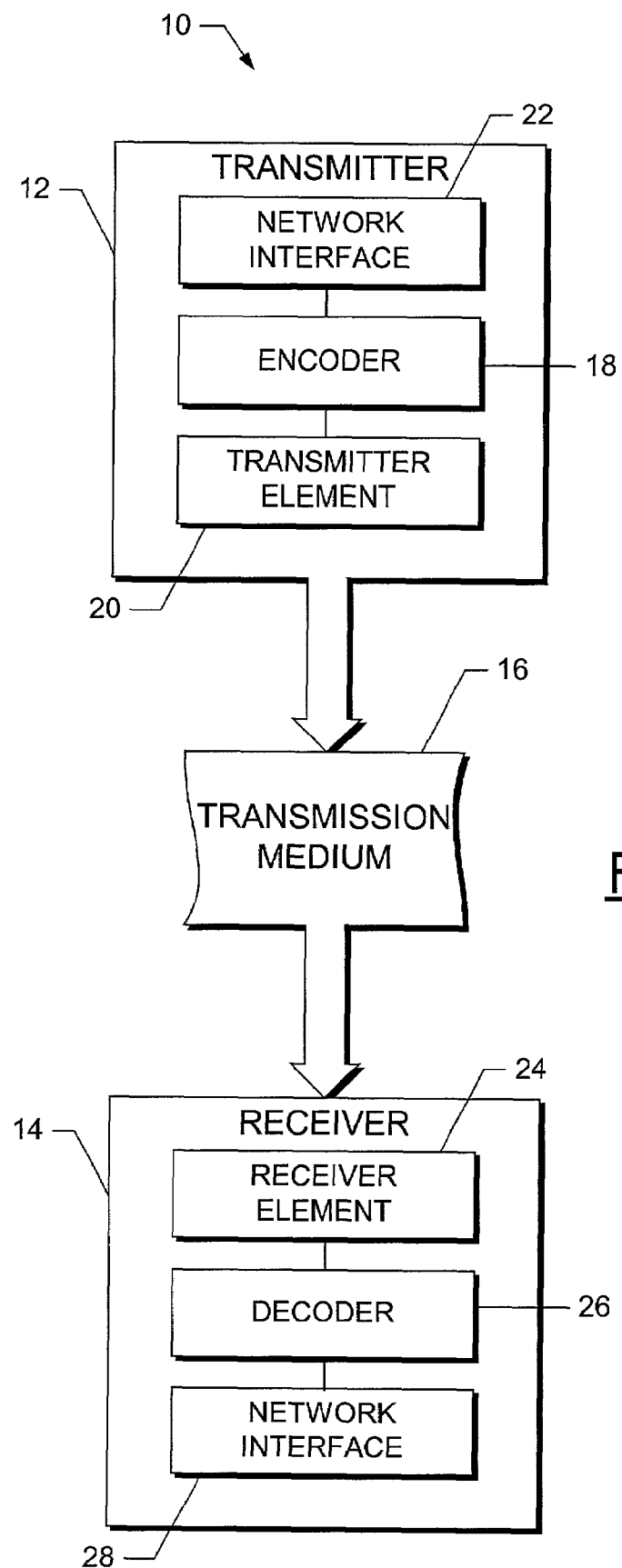
Figure 2:
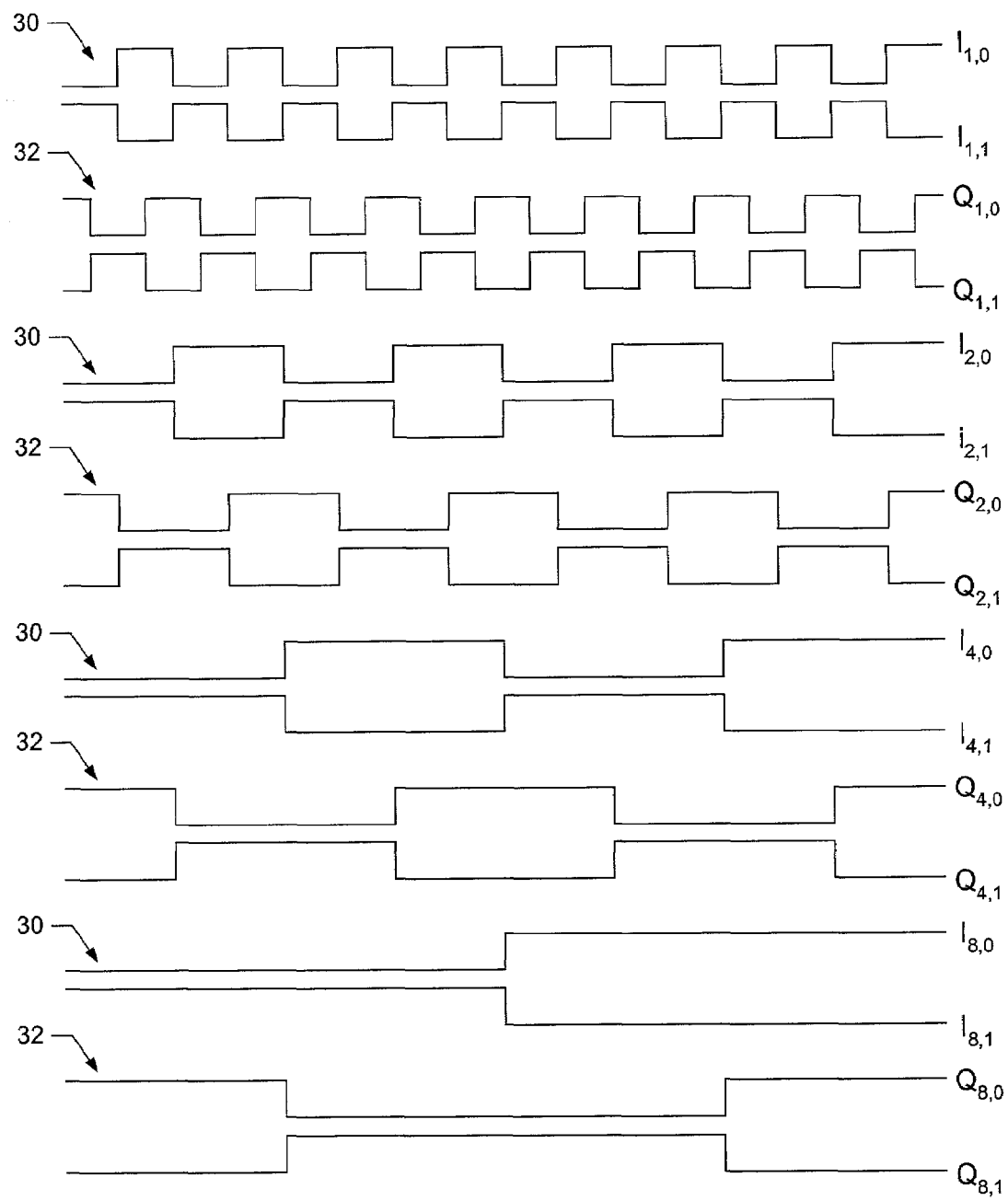
Figure 3:
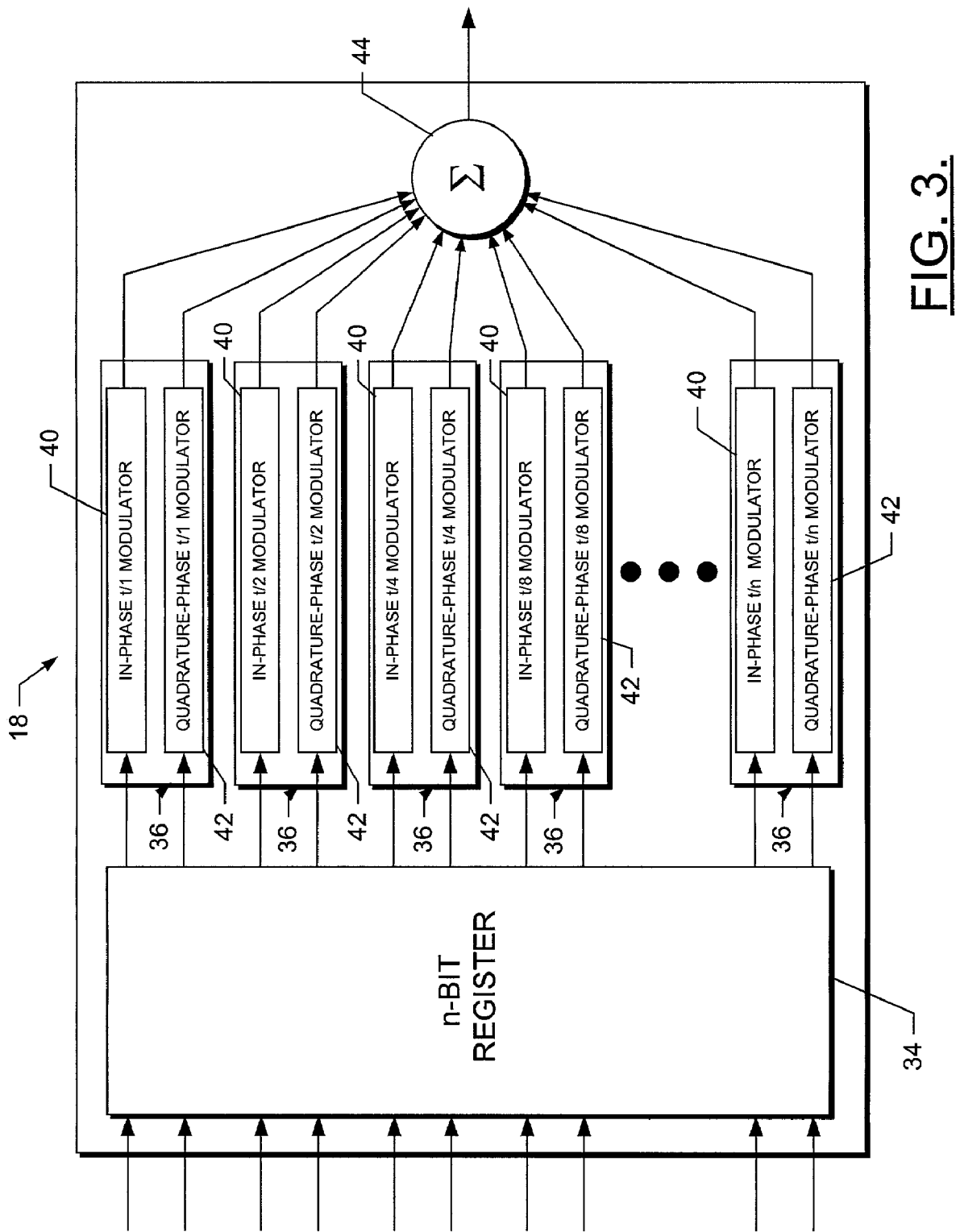
Figure 4:
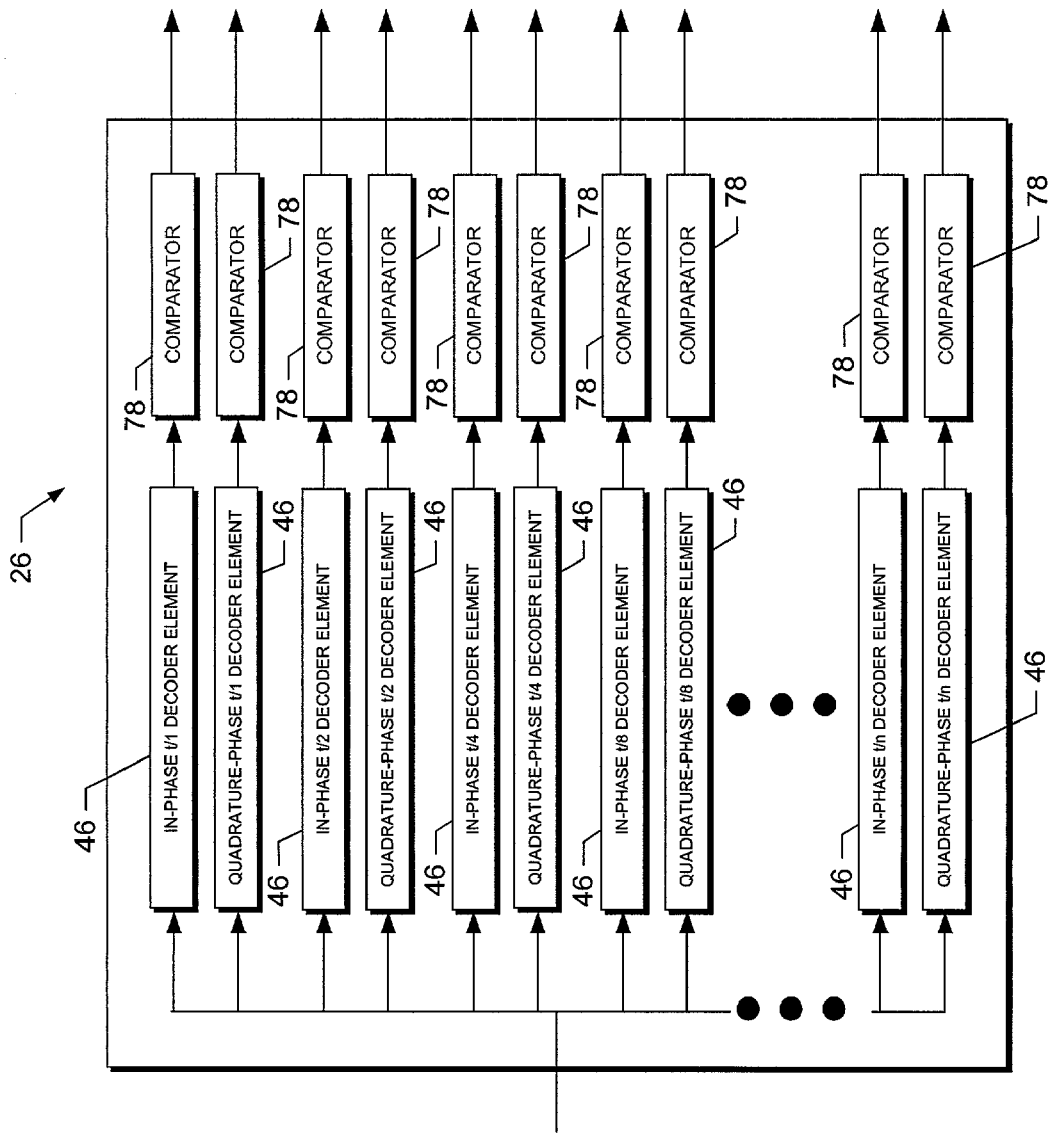
Figure 5:
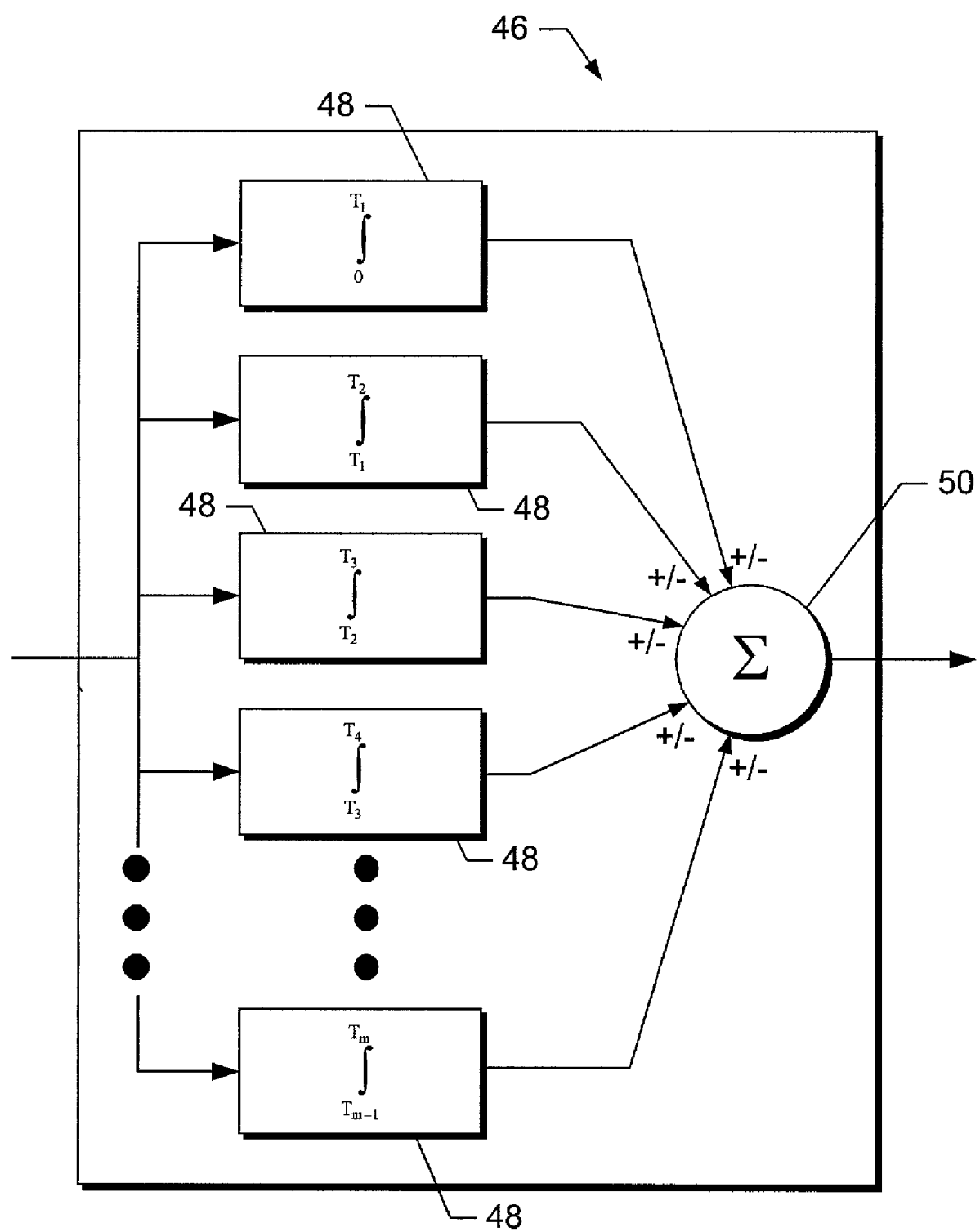
Figure 6:
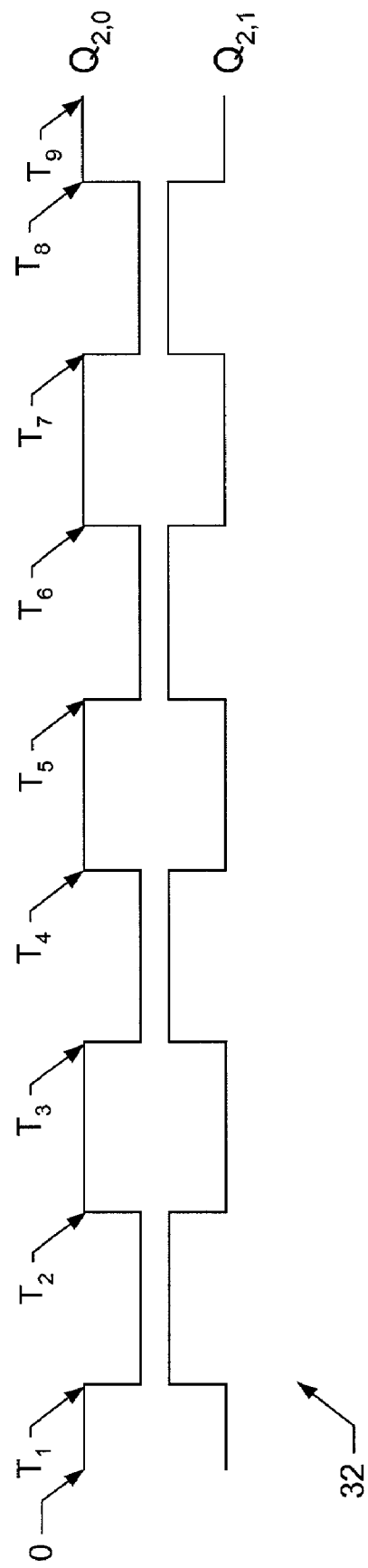
Figure 7:
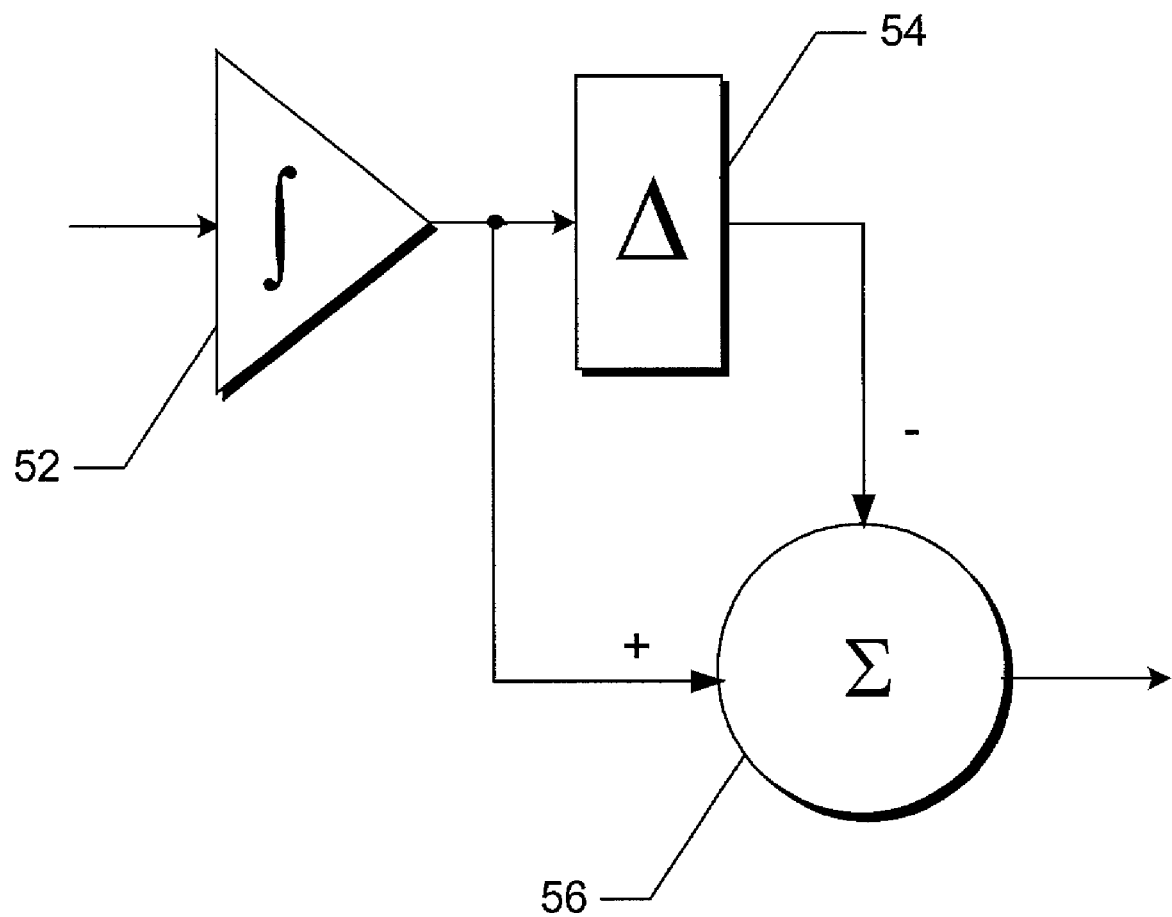
Figure 8A:
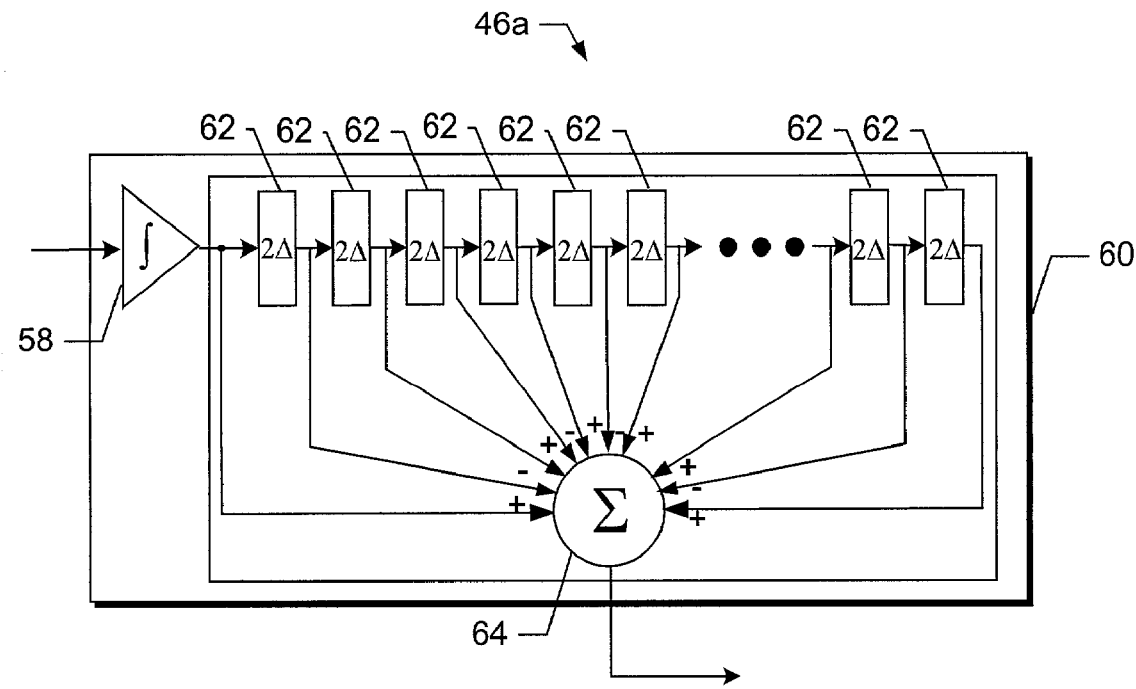
Figure 8B:
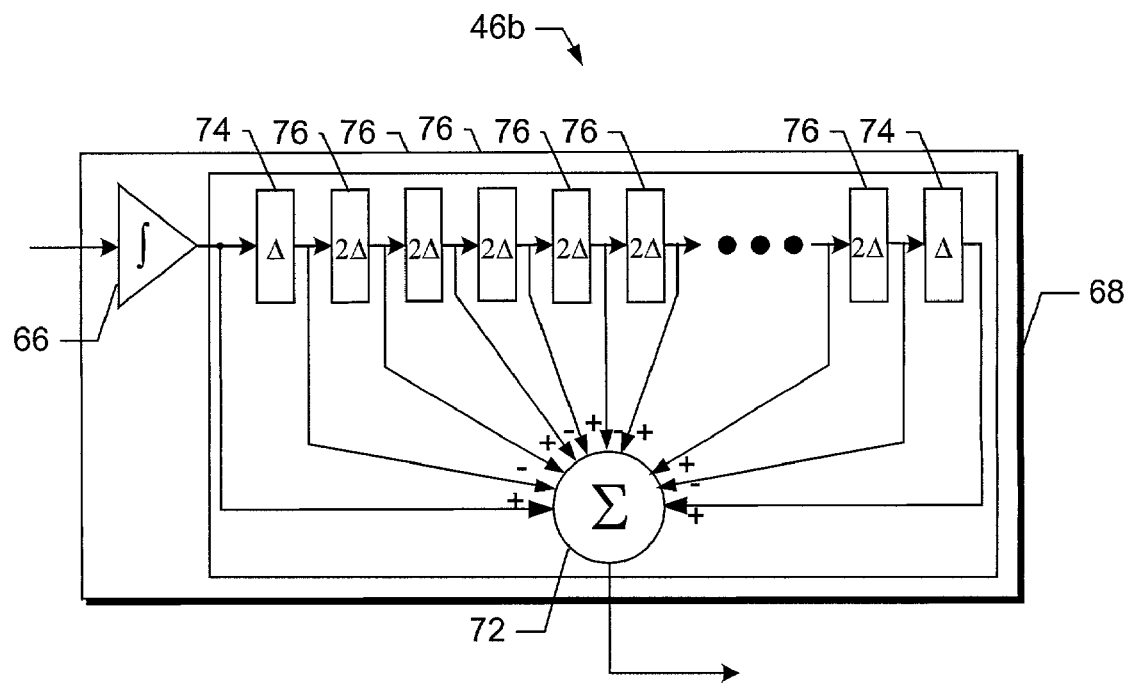
Figure 9:
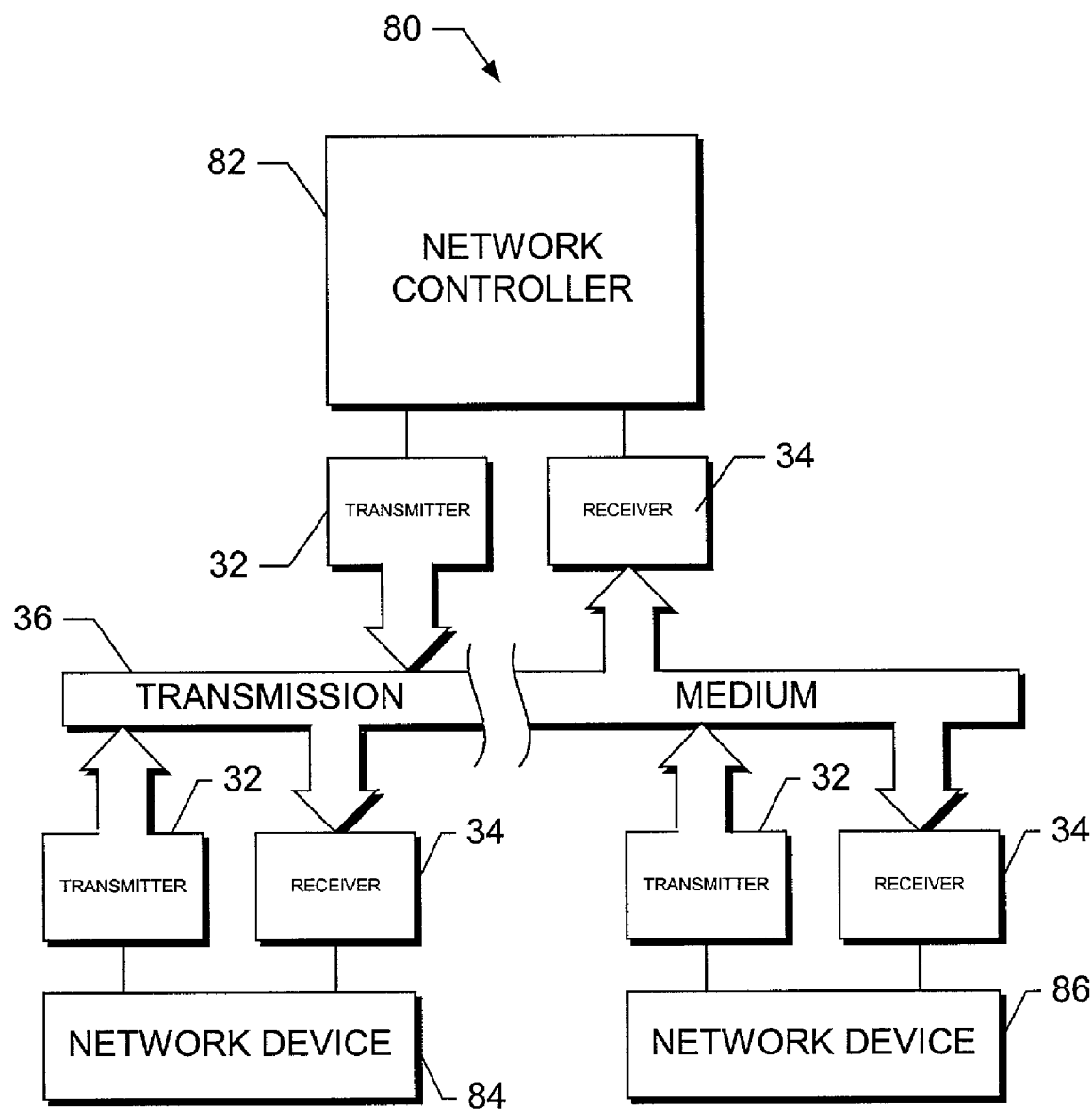

Having thus described the invention in general terms, reference will now be made to the accompanying drawings, which are not necessarily drawn to scale, and wherein:

FIG. 1 is a schematic block diagram of a digital communications system according to one embodiment of the present invention;

FIG. 2 is a timing diagram illustrating an exemplar 8 symbol communications standard according to one embodiment of the present invention;

FIG. 3 is a schematic diagram illustrating an encoder according to one embodiment of the present invention;

FIG. 4 is a schematic diagram of a decoder according to one embodiment of the present invention;

FIG. 5 is a schematic diagram of a decoder element according to one embodiment of the present invention;

FIG. 6 is a timing diagram of one symbol of the exemplar 8 symbol communications standard illustrated in FIG. 2 highlighting timing points, T, at instances where the signal changes state;

FIG. 7 is a schematic diagram illustrating elements capable of determining the integral over a given time interval;

FIGS. 8A and 8B are schematic diagrams illustrating decoder elements for the in-phase and quadrature-phase portions, respectively, of the QAM signal according to one embodiment of the present invention; and FIG. 9 is a schematic block diagram illustrating an exemplar network system that can utilize the digital communications system of one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, one configuration for a digital communications system 10 according to the present invention includes a transmitter 12 and a receiver 14 electrically connected via a transmission medium 16. The transmitter of the digital communications system includes an encoder 18 that is configured according to a predetermined communications standard and encodes digital data signals according to the predetermined communications standard. Also, if the transmitter is included within a network, the transmitter can additionally include a network interface 22 connected between a network device and the encoder of the transmitter such that the network device can communicate via the transmission medium by generating the digital data signals.

The predetermined communications standard assigns the signal characteristics, or "symbols," which define a logic "0" and a logic "1." And as such, predetermined communications standard can be any of a number of different communications standards. But in a preferred embodiment, the communications standard defines the symbols according to a quadrature amplitude modulation (QAM) technique based on at least one carrier frequency. As known to those skilled in the art, QAM is a modulation technique that is generally a combination of amplitude modulation and phase shift keying. In this regard, in QAM, two digital data signals can be amplitude modulated by two carrier signals. Both carrier signals have the same carrier frequency, but one of the carrier signals, often referred to as the quadrature signal, is exactly 90 degrees out of phase with, or orthogonal to, the other carrier signal, often referred to as the in-phase signal.

The digital communications system 10 generally transmits n-bit digital data signals at a transmission rate of t bits per second, b/s. To transmit the encoded digital data signals most efficiently, the predetermined communications standard preferably includes a symbol for each bit of the digital data signals, or n symbols. Because the QAM signal at each carrier frequency can comprise an in-phase portion and a quadrature-phase portion, each portion at each carrier frequency can represent one symbol. As shown in FIG. 2, for example, the digital communications system can be used to transmit 8-bit digital data signals. In this example, the predetermined communications standard would include 8 symbols. With each carrier frequency capable of representing two symbols (one in-phase 30 and one quadrature-phase 32), the 8 symbol communications standard would require four carrier frequencies.

The carrier frequencies can be any of a number of frequencies less than the transmission rate but, in a preferred embodiment, the carrier frequencies are a fraction of the transmission rate by powers of two up to the number of bits in the digital data signal (i.e., i=1, 2, 4, 8 . . . n), as shown in equation (1):

$$f_c = t/i \qquad (1)$$

For example, assuming the 8-bit digital data signals have a transmission rate of 100 Mb/s, the four carrier frequencies could comprise 100 MHz, 50 MHz, 25 MHz and 12.5 MHz. By selecting the carrier frequencies according to equation (1), modulation of the square-wave digital signals can be accomplished without concern for the harmonics of different carrier frequencies mixing with one another.

As shown in the illustrated example, the QAM signal at each carrier frequency includes an in-phase portion, I, and a quadrature portion, Q, with each carrier frequency comprising a fraction of the transmission rate. In this regard, each symbol comprising the in-phase portion of the QAM signal can be designed as $I_i$; and each symbol comprising the quadrature-phase portion of the QAM signal can be designed as $Q_i$. Thus, according to the example that includes 8 symbols, the symbols can be designed as follows: $I_1$, $Q_1$, $I_2$, $Q_2$, $I_4$, $Q_4$, $I_8$ and $Q_8$. Additionally, considering that each symbol of the predetermined communications standard is capable of representing either a logical "0" or a logical "1," each in-phase portion can be fully designed as either $I_{i,0}$ or $I_{i,1}$; and each quadrature-phase portion can be fully designated as either $Q_{i,0}$ or $Q_{i,1}$, as shown in FIG. 2.

As shown in FIG. 3, the encoder 18 includes a register 34, at least one QAM modulator 36, and a summing element 38. The register is an n-bit register and is capable of receiving the n-bit digital data signal and outputting the n-bit digital data signal in parallel to the QAM modulators at the transmission rate, t. In this regard, the register can receive the digital data signal at any one of a number of transmission rates. The register can either be a parallel-to-parallel register, as shown in FIG. 3, or a serial-to-parallel register depending on whether the encoder receives the digital data signal in parallel or in serial. From the register, the digital data signals are received by the QAM modulators.

Because each carrier frequency is capable of representing two symbols, each QAM modulator 36 is capable of receiving two bits of the n-bit digital data signal and, as such, the encoder 18 includes n/2 QAM modulators. In this regard, each QAM modulator includes an in-phase modulator 40 and a quadrature-phase modulator 42. The in-phase modulator of a respective QAM modulator is capable of modulating one bit with a respective carrier signal having a frequency, $f_c$; and the quadrature-phase modulator of the respective QAM modulator is capable of modulating the next bit with the respective carrier frequency, $f_c$, at a phase orthogonal to that of a respective in-phase modulator modulating at the same carrier frequency. Because each QAM modulator also amplitude modulates each bit, each carrier signal has an amplitude between −A and A. The amplitude A can be any of a number of different amplitudes depending upon the desired output from the encoder and, thus, the transmitter. From the QAM modulators, each modulated bit is received by the summing element 44, which adds the bits into one QAM signal, as such is known to those skilled in the art.

Referring back to FIG. 1, to drive the QAM signal onto the transmission medium 16, the transmitter 12 further includes a transmitter element 20. Because the instantaneous signal transitions associated with the square-wave digital data signals have been modulated according to the QAM technique, the transmitter element is preferably an analog driver. After the transmitter element 20 has driven the QAM signal onto the transmission medium 16, the QAM signal travels through the transmission medium from the transmitter 12 to the receiver 14. The transmission medium can be any of a number of mediums, including a single-ended transmission line which, if the system is employed in a network, can comprise a network bus. Advantageously, because QAM spreads the signal energy over multiple carrier frequencies, the predetermined communications standard allows the transmission medium to comprise a twisted-pair differential transmission line and support high-speed transmission, while keeping electromagnetic emissions within the stringent standards imposed by many complex systems used in applications such as aircraft and automotive.

From the transmission medium 16, the receiver 14 can receive the QAM signal. The receiver includes a receiver element 24, a decoder 26 and a network interface 28 (for embodiments where the receiver is included within a network). The receiver element, such as an analog receiver, is capable of receiving the QAM signal from the transmission medium and thereafter passing the QAM signal to the encoder, which can convert the QAM signal into the original digital data signal.

Referring to FIG. 4, the decoder 26 includes at least one decoder element 46 capable of decoding the QAM signal into a representation of each bit of the n-bit digital data signal. In this regard, the decoder includes n decoder elements, each of which is preferably a matched filter to the respective modulator. Each decoder element can comprise any one of a number of different of different devices. For example, each decoder element can comprise at least one integrator 48 connected in parallel, and a summing element 50, as shown in FIG. 5. Each integrator receives the QAM signal and outputs the time integral of the QAM signal over a predetermined subinterval of time. The outputs of each integrator can then be summed with the summing element to the representation of a respective bit of the n-bit signal. As shown, each decoder element can include m integrators, with each having predetermined start and stop timing that define the predetermined subinterval of time. In this regard, T. represents the timing points at which a respective symbol changes state, with each pair of timing points (beginning with $0\text{-}T_1$) representing the subintervals of time, as shown in FIG. 6 with respect to the symbol $Q_2$ illustrated in FIG. 2.

Alternatively, each decoder element 46 can comprise a single integrator to integrate the QAM signal over each subinterval of the respective symbol (not shown). As known to those skilled in the art, the integrate-and-dump method utilizes a single integrator to integrate the first subinterval and store the integral in a dedicated sample-and-hold element. The stored charge in the integrator is then dumped (i.e., the integrator is reset to zero), and the integrator integrates the next interval and stores the integral of the next integral in the sample-and-hold element. The integrator is again reset, and the process continues for each subinterval.

Whereas each decoder elements 46 can comprise one or more integrators that integrate the QAM signal over predetermined time periods, such implementations become complex and expensive for QAM signals traveling at high transmission rates. In this regard, for the integrator(s) to properly integrate the QAM signal over predetermined time periods, the integrator(s) must be capable of switching to and from the start and stop times at a fraction of the respective subintervals. And as the subintervals for very high-speed transmission rates can be as short as 2.5 nanoseconds or shorter, the switching requires more complex and expensive integrators. As an alternative to the aforementioned implementations of the decoder elements, the decoder can include a processor to perform the functions of the decoder elements. However, due to the required switching, the decoder would require a complex and expensive processor that would make the decoder cost prohibitive for most applications.

To allow the decoder 26 to decode QAM signals traveling at a high transmission rate, each decoder element preferably does not switch at the subintervals of the respective symbol where the symbol changes state. In this regard, referring now to FIG. 7, it should be understood that any integral taken over a predetermined time period can be represented as the difference between two continuous-time integrals terminated at two different times, as shown in equation (2):

$$\int_b^a x\,dx = \int_{-\infty}^b x\,dt - \int_{-\infty}^a x\,dt \tag{2}$$

By sampling the output of a continuously-running integrator 52 at times a and b, and subtracting the sample at time a from the sample at time b, the integral over the interval a-b results. Representing the interval as a delay, $\Delta$, the integral over interval a-b can be determined using the continuously running integrator along with a delay element 54 and a summing element 56. And as such, each decoder element preferably includes a continuously-running integrator along with a tapped-delay line filter that includes at least one delay element and a summing element. As shown in FIGS. 8A and 8B, respectively, the decoder includes in-phase decoder elements 46a and quadrature-phase decoder elements 46b.

Referring to FIG. 8A, the in-phase decoder elements 46a each include a continuously-running integrator 58, and a tapped-delay line filter 60 comprising at least one delay element 62 and a summing element 64. The tapped-delay line filter includes $m_{in}$ delay elements, with the number of delay elements preferably determined according to the following equation (3):

$$m_{in} = (f_c/t) \times 2 \times n \tag{3}$$

Additionally, the delay element of each decoder element preferably has a delay of $2\Delta$, with $\Delta$ determined according to equation (4) as follows:

$$\Delta = n/(2 \times t \times m_{in}) \tag{4}$$

As an example, consider one symbol of an 8 symbol QAM signal having a transmission rate of 100 Mb/s, with the symbol made of the in-phase portion of the carrier frequency 50 MHz. Utilizing equation (3), the number of delay elements 62 can be calculated as 8. Also, utilizing equation (4), the delay, $\Delta$, can be calculated as 5 nanoseconds, thus making the delay of each delay element, $2\Delta$, equal to 10 nanoseconds. As is evident by the foregoing example, multiplying the number of delay elements (8) by the delay of each delay element (10 ns) gives the amount of time required to transmit one bit of the n-bit digital data signal (80 ns). And dividing the number of bits (8) by the amount of time required to transmit one bit of the n-bit digital data signal (80 ns) gives the transmission rate, t, (100 Mb/s).

Turning to FIG. 8B, the quadrature-phase decoder elements 46b also include a continuously-running integrator 66, and a tapped-delay line filter 68 comprising at least one delay element and a summing element 72. The tapped-delay line filter includes, $m_q$, delay elements, with the number of delay elements equaling one more than the number of delay elements for the respective in-phase decoder element 46a of the same carrier frequency. The number of delay elements can be determined according to the following equation (5):

$$m_q(f_c/t) \times 2 \times n + 1 \tag{5}$$

Because the quadrature-phase carrier signal is orthogonal to the in-phase carrier signal for a given carrier frequency, the quadrature-phase decoder elements include end delay elements 74 with a delay that differs from the other, intermediate delay elements 76. In this regard, the end delay elements have a delay of $\Delta$ and the intermediate delay elements have a delay of $2\Delta$, with $\Delta$ determined according to equation (6) as follows:

$$\Delta = n/(2 \times t \times (m_q - 1)) \tag{6}$$

As an example, consider one symbol of the 8 symbol QAM having the same 100 Mb/s transmission rate and 50 MHz carrier frequency as before, with the symbol made of the quadrature-phase portion of the carrier frequency. Utilizing equation (5), the number of delay elements can be calculated as 9, including 7 intermediate delay elements 76 and 2 end delay elements 74. Also, utilizing equation (6), the delay, Δ, can be calculated as 5 nanoseconds. As such, the delay of each end delay element, Δ, is equal to 5 nanoseconds, and the delay of each intermediate delay element, 2Δ, is equal to 10 nanoseconds. Similar to the in-phase decoder elements 46a, adding together the products of the number of end and intermediate delay elements (9) and the respective delays (2*5 ns+7*10 ns) gives the amount of time required to transmit one bit of the n-bit digital data signal (80 ns), which is the same amount of time for the respective in-phase portion having the same carrier frequency. And dividing the number of bits (8) by the amount of time required to transmit one bit of the n-bit digital data signal (80 ns) gives the transmission rate, t, (100 Mb/s).

Referring back to FIG. 4, because the decoder elements decode an analog QAM signal into a representation of the n-bit digital data signal, the decoder preferably further includes n comparators 78 that are capable of receiving the representation of a respective bit of the n-bit digital data signal and thereafter outputting the respective bit of the n-bit digital signal. As known, comparators input two analog signals and output a binary, square-wave signal, which remains constant as the differential input voltage increases or decreases. To output each bit of the n-bit digital data signal, each comparator inputs the respective representation of the digital data signal along with a reference data signal that is set at a threshold level between the minimum and maximum voltage levels of the QAM signal, or between −A and A. When the representation of the digital data signals is at a level between the threshold and the minimum, the comparator outputs the minimum voltage level of the digital data signals, such as zero volts. And when the representation of the digital data signals is at a level between the maximum and the threshold, the comparator outputs the maximum voltage level of the digital data signals. The threshold of the comparator can be set at any one of a number of different levels between the minimum and maximum voltage levels of the representation of the digital data signals. For example, the threshold can be set halfway between the minimum and maximum voltage levels (−A and A).

Once the comparators 78 have output each bit of the n-bit digital data signal, the digital data signal can be utilized by a device connected to the receiver 14, such as by a network device in embodiments where the transmitter 12 and receiver are included within a network and each include network interfaces 22, 28. As shown, the comparators output the n-bit digital data signal in parallel. However, if serial output is desired, the decoder 26 or receiver 14 can include a parallel-to-serial register (not shown) to convert the parallel n-bit digital data signal to a serial n-bit digital data signal.

As indicated above, the transmitter 12 and receiver 14 can be included within a network where the transmission medium 16 comprises a network bus. In this regard, one exemplar network is illustrated in FIG. 9 and described in U.S. patent application Ser. No. 09/735,146, entitled: *Network Device Interface for Digitally Interfacing Data Channels to a Controller Via a Network* filed on Dec. 12, 2000 and U.S. patent application Ser. No. 09/736,878, entitled: *Network Controller for Digitally Controlling Remote Devices Via a Common Bus* filed on Dec. 14, 2000 both of which are incorporated herein by reference. As shown in FIG. 9, the exemplar network system 80 has a host computer or network controller 82 and a number of network devices 84, 86, in addition to a number of transmitters, receivers and the transmission medium (i.e., network bus). In this configuration, the network controller typically provides configuration and control of the network and, therefore, directs communications with the network devices. In operation, the bus controller typically transmits commands via a respective transmitter and the network bus to the network devices. The network device or devices, in turn, receive the commands via the network bus and respective receivers, and thereafter perform the actions associated with the command.

The system, decoder and method of the present invention therefore modulate the data signals according to the QAM method to thereby spread the signal energy over multiple carrier frequencies. As such, the present invention allows for high-speed data transmission and reception with a substantial reduction in electromagnetic emissions. The reduction in electromagnetic emissions allows the system, decoder and method of the present invention to transmit and receive high-speed data signals over conventional low-cost transmission mediums, such as twisted-pair cable. Further, the system, decoder and method of the present invention is capable of decoding the high-speed data signals in a relatively straightforward and inexpensive manner when compared to conventional systems.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A decoder for decoding at least one quadrature amplitude modulated (QAM) signal into at least one n-bit digital signal, said decoder comprising:
   at least one integrator configured for integrating the at least one QAM signal; and
   at least one tapped-delay line filter comprising at least one delay element, wherein said at least one tapped-delay line filter is configured for receiving the integrated at least one QAM signal and thereafter outputting a representation of each bit of the at least one n-bit digital signal,
   wherein the at least one QAM signal is capable of being transmitted at a rate of t, wherein the at least one QAM signal includes at least one in-phase portion modulated by at least one carrier signal at a carrier frequency of $f_c$, wherein at least one integrator is configured for integrating the in-phase portion of the at least one QAM signal, wherein at least one tapped-delay line filter is configured for receiving the integrated in-phase portion of the at least one QAM signal and thereafter outputting a representation of at least one bit of the at least one n-bit digital signal, and wherein the number of delay elements of the at least one tapped-delay line filter is based on the number of bits n, the transmission rate t and the carrier frequency $f_c$.

2. A decoder according to claim 1 further comprising at least one comparator configured for receiving the representation of each bit of the at least one n-bit digital signal and thereafter outputting each bit of the at least one n-bit digital signal based upon a comparison of the representation of each bit to a predetermined threshold.

3. A decoder according to claim 1, wherein said at least one integrator comprises n integrators, and wherein said at least one tapped-delay line filter comprises n tapped-delay line filters.

4. A decoder according to claim 3 further comprising n comparators configured for receiving the representation of each bit of the at least one n-bit digital signal and thereafter outputting each bit of the at least one n-bit digital signal based upon a comparison of the representation of each bit to a predetermined threshold.

5. A decoder according to claim 1, wherein the at least one carrier frequency comprises n/2 carrier frequencies, wherein each carrier frequency is equal to a fraction of the transmission rate t/i where i=1, 2, 4, 8 . . . n.

6. A decoder according to claim 1, wherein the number of delay elements, $m_{in}$, of the at least one tapped-delay line filter that is configured for receiving the integrated in-phase portion of the at least one QAM signal equals $(f_c/t) \times 2 \times n$.

7. A decoder according to claim 6, wherein each delay element of the at least one tapped-delay line filter that is configured for receiving the integrated in-phase portion of the at least one QAM signal has a delay of $2\Delta$, wherein $\Delta$ equals $n/(2 \times t \times m_{in})$.

8. A decoder according to claim 1, wherein the at least one QAM signal includes at least one quadrature-phase portion that includes a phase orthogonal to the at least one in-phase portion of the at least one QAM signal, wherein at least one integrator is configured for integrating the quadrature-phase portion of the at least one QAM signal, and wherein at least one tapped-delay line filter is configured for receiving the integrated quadrature-phase portion of the at least one QAM signal and thereafter outputting a representation of at least one bit of the at least one n-bit digital signal.

9. A decoder according to claim 8, wherein the number of delay elements $m_q$ of the at least one tapped-delay line filter that is configured for receiving the integrated quadrature-phase portion of the at least one QAM signal equals $(f_c/t) \times 2 \times n+1$.

10. A decoder according to claim 9, wherein the at least one delay element of the at least one tapped-delay line filter that is configured for receiving the integrated quadrature-phase portion of the at least one QAM signal includes intermediate delay elements bounded by at least one end delay element, wherein each intermediate delay element has a delay of $2\Delta$ and each end delay element has a delay of $\Delta$, wherein $\Delta$ equals $n/(2 \times t \times (m_q 1))$.

11. A digital communications system comprising:
a transmitter configured for quadrature amplitude modulation (QAM) encoding each bit of at least one n-bit digital signal into at least one QAM signal, wherein said transmitter is configured for transmitting the at least one QAM signal; and
a receiver configured for receiving the at least one QAM signal, wherein said receiver is configured for integrating the at least one QAM signal, wherein said receiver includes at least one tapped-delay line filter having at least one delay element, the at least one tapped-delay line filter being configured for receiving the integrated at least one QAM signal and thereafter outputting a representation of each bit of the at least one n-bit digital signal,
wherein said transmitter is configured for transmitting the at least one QAM signal at a rate of t, wherein the at least one QAM signal includes at least one in-phase portion modulated by at least one carrier signal at a carrier frequency of $f_c$, wherein said receiver is configured for integrating the in-phase portion of the at least one QAM signal, wherein at least one tapped-delay line filter is configured for receiving the integrated in-phase portion of the at least one QAM signal and thereafter outputting a representation of at least one bit of the at least one n-bit digital signal, and wherein the number of delay elements of the at least one tapped-delay line filter is based on the number of bits n, the transmission rate t and the carrier frequency $f_c$.

12. A digital communications system according to claim 11, wherein said receiver is further configured for outputting each bit of the at least one n-bit digital signal based upon a comparison of the representation of each bit to a predetermined threshold.

13. A digital communications system according to claim 11, wherein said receiver comprises n integrators configured for integrating the at least one QAM signal, and wherein said receiver includes n tapped-delay line filters.

14. A digital communications system according to claim 13, wherein said receiver further comprises n comparators configured for receiving the representation of each bit of the at least one n-bit digital signal and thereafter outputting each bit of the at least one n-bit digital signal based upon a comparison of the representation of each bit to a predetermined threshold.

15. A digital communications system according to claim 11, wherein the at least one carrier frequency comprises n/2 carrier frequencies, wherein each carrier frequency is equal to a fraction of the transmission rate t/i where i=1, 2, 4, 8 . . . n.

16. A digital communications system according to claim 11, wherein the number of delay elements, $m_{in}$, of the at least one tapped-delay line filter that is configured for receiving the integrated in-phase portion of the at least one QAM signal equals $(f_c/t) \times 2 \times n$.

17. A digital communications system according to claim 16, wherein each delay element of the at least one tapped-delay line filter that is configured for receiving the integrated in-phase portion of the at least one QAM signal has a delay of $2\Delta$, wherein $\Delta$ equals $n/(2 \times t \times m_{in})$.

18. A digital communications system according to claim 11, wherein the at least one QAM signal includes at least one quadrature-phase portion that includes a phase orthogonal to the at least one in-phase portion of the at least one QAM signal, wherein at least one integrator is configured for integrating the quadrature-phase portion of the at least one QAM signal, and wherein at least one tapped-delay line filter is configured for receiving the integrated quadrature-phase portion of the at least one QAM signal and thereafter outputting a representation of at least one bit of the at least one n-bit digital signal.

19. A digital communications system according to claim 18, wherein the number of delay elements $m_q$ of the at least one tapped-delay line filter that is configured for receiving the integrated quadrature-phase portion of the at least one QAM signal equals $(f_c/t) \times 2 \times n+1$.

20. A digital communications system according to claim 19, wherein the at least one delay element of the at least one tapped-delay line filter that is configured for receiving the integrated quadrature-phase portion of the at least one QAM signal includes intermediate delay elements bounded by at least one end delay element, wherein each intermediate delay element has a delay of $2\Delta$ and each end delay element has a delay of $\Delta$, wherein $\Delta$ equals $n/(2 \times t \times (m_q-1))$.

21. A method of decoding at least one quadrature amplitude modulated (QAM) signal into at least one n-bit digital signal, said method comprising:

integrating the at least one QAM signal; and filtering the integrated at least one QAM signal, wherein filtering comprises passing the integrated at least one QAM signal through at least one delay element aligned in series, wherein an output of each delay element is summed together with the integrated at least one QAM signal to thereby output a representation of the at least one n-bit digital signal, wherein the at least one QAM signal is capable of being transmitted at a rate of t, wherein the at least one QAM signal includes at least one in-phase portion modulated by at least one carrier signal at a carrier frequency of $f_c$, wherein integrating the at least one QAM signal comprises integrating the in-phase portion of the at least one QAM signal, wherein filtering the integrated at least one QAM signal comprises passing the integrated in-phase portion of the at least one QAM signal through at least one delay element aligned in series, wherein an output of each delay element is summed together with the integrated in-phase portion of the at least one QAM signal to thereby output a representation of at least one bit of the at least one n-bit digital signal, and wherein the method further comprises determining the number of delay elements of the at least one tapped-delay line filter based on the number of bits n, the transmission rate t and the carrier frequency $f_c$.

22. A method according to claim 21 further comprising receiving the representation of each bit of the at least one n-bit digital signal and thereafter outputting each bit of the at least one n-bit digital signal based upon a comparison of the representation of each bit to a predetermined threshold.

23. A method according to claim 21, wherein determining the number of delay elements comprises determining the number of delay elements of the at least one tapped-delay line filter that is configured for receiving the integrated in-phase portion of the at least one QAM signal before filtering the integrated at least one QAM signal, wherein the number of delay elements, $m_{in}$, of the at least one tapped-delay line filter that is configured for receiving the integrated in-phase portion of the at least one QAM signal equals $(f_c/t) \times 2 \times n$.

24. A method according to claim 23 further comprising determining the delay of each delay element of the at least one tapped-delay line filter that is configured for receiving the integrated in-phase portion of the at least one QAM signal after determining the number of delay elements, wherein each delay element of the at least one tapped-delay line filter that is configured for receiving the integrated in-phase portion of the at least one QAM signal has a delay of $2\Delta$, and wherein $\Delta$ equals $n/(2 \times t \times m_{in})$.

25. A method according to claim 21, wherein the at least one QAM signal includes at least one quadrature-phase portion that includes a phase orthogonal to the at least one in-phase portion of the at least one QAM signal, wherein integrating the at least one QAM signal further comprises integrating the quadrature-phase portion of the at least one QAM signal, and wherein filtering the integrated at least one QAM signal comprises passing the integrated quadrature-phase portion of the at least one QAM signal through at least one delay element aligned in series, and wherein an output of each delay element is summed together with the integrated quadrature-phase portion of the at least one QAM signal to thereby output a representation of at least one bit of the at least one n-bit digital signal.

26. A method according to claim 25, wherein determining the number of delay elements comprises determining the number of delay elements of the at least one tapped-delay line filter that is configured for receiving the integrated quadrature-phase portion of the at least one QAM signal before filtering the integrated at least one QAM signal, wherein the number of delay elements $m_q$ of the at least one tapped-delay line filter that is configured for receiving the integrated quadrature-phase portion of the at least one QAM signal equals $(f_c/t) \times 2 \times n + 1$.

27. A method according to claim 26, wherein the at least one delay element of the at least one tapped-delay line filter that is configured for receiving the integrated quadrature-phase portion of the at least one QAM signal includes intermediate delay elements bounded by at least one end delay element, said method further comprising determining the delay of each intermediate delay element and each end delay element after determining the number of delay elements, wherein each intermediate delay element has a delay of $2\Delta$ and each end delay element has a delay of $\Delta$, and wherein $\Delta$ equals $n/(2 \times t \times (m_q - 1))$.

* * * * *